Feb. 18, 1964 G. W. MOUNT 3,121,351
DRILL
Filed Feb. 9, 1962
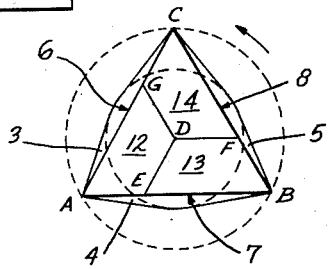
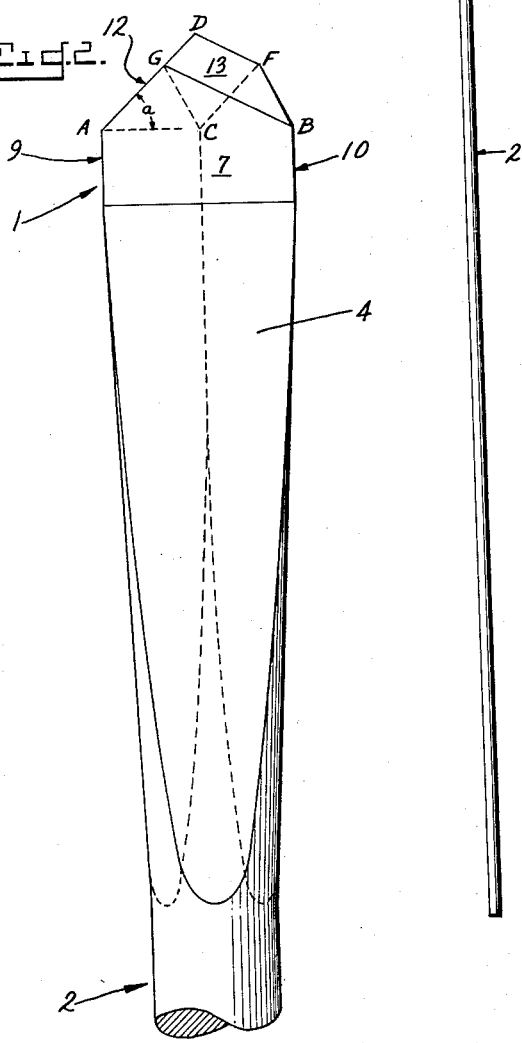
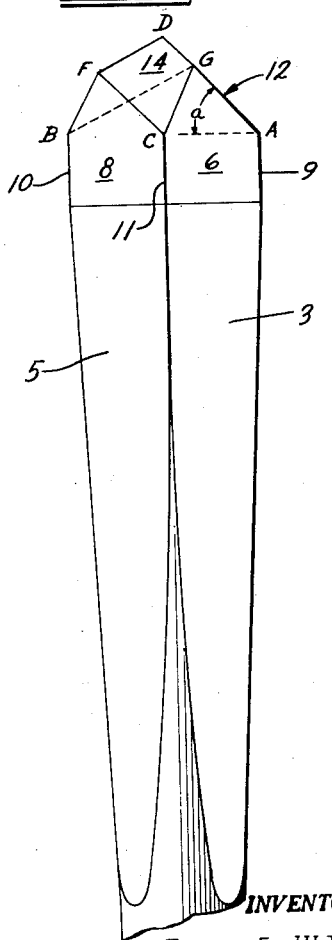
INVENTOR.
George W. Mount
BY Chapin + Neal
Attorneys United States Patent Office 3,121,351
Patented Feb. 18, 1964

3,121,351
DRILL
George W. Mount, 576 Leyden Road, Greenfield, Mass.
Filed Feb. 9, 1962, Ser. No. 172,326
3 Claims. (Cl. 77—67)

This invention relates to drills and more particularly to drills for use in drilling relatively long dowel receiving openings in the assembling the elements of articles of furniture, various frame structures, and similar devices.

It is among the objects of the invention to provide a drilling head integral with a relatively long shank which will provide a maximum of chip clearance during the drilling of relatively deep holes and at the same time maintain directional accuracy in the drilling of such holes.

A further object is to provide a drill having the above capabilities which can be manufactured at low cost.

Other and further objects and advantages will be made apparent in the disclosure of the accompanying drawing and the following specification and claims.

In the accompanying drawing:

FIG. 1 is a side view of a drill embodying the invention;

FIG. 2 is a view on an enlarged scale of the head of the drill as shown in FIG. 1;

FIG. 3 is a top end view of the drill as shown in FIG. 2; and

FIG. 4 is a view looking from the rear of FIG. 2.

Referring to the drawing the drill comprises a head portion generally indicated at 1, and an elongated shank generally indicated at 2.

As best shown in FIG. 3 the cutting head 1 is equilateral-triangular in cross section, the cutting radius of the drill being equal to ⅔ of the altitude of that triangle.

The drill is conveniently and preferably formed by forging or swaging one end portion of a cylindrical rod to equilateral-triangular cross section, concentric with the longitudinal axis of the rod, thus forming side faces 3, 4 and 5 (FIGS. 2 and 4) which are inclined to the axis of the drill, and taper into the surface of the unforged portion of the rod which forms the shank 2 of the drill.

The cutting head 1 is formed by grinding the side of the end portion of the so-formed triangular end portion of the rod to bring the head to desired cutting diameter and to form planar side faces 6, 7 and 8 which are parallel to, and equally spaced from, the common longitudinal axis of the head and shank and which intersect to form edges 9, 10 and 11. The end face of the cutting head is then ground successively on three grinding planes which respectively intersect successive side faces of the head at an angle (a) to a plane at right angles to the common axis of the head and shank and which latter plane intersects the edges 9, 10 and 11 at A, B and C respectively, thereby forming three planar end faces 12, 13 and 14 which intersect the common axis of the head and shank at the common point D and each other along lines DE, DF and DG, which lines form the initial cutting edges of the drill. The faces 12, 13 and 14 also respectively intersect the side faces 7, 8 and 6 along respective lines EA, FB and GC which, assuming the drill is rotated in the direction of the arrow in FIG. 3, trail the respective edges DE, DF and DG at an angle to bring the bore to the full cutting diameter of the head.

If the drill is rotated in the direction reverse to the arrow, the edges EB, FC and GA will function as cutting edges trailing the initial cutting edges DE, DF and DG.

The points A, B and C lie in the cutting circumference of the drill and respectively in the lines of intersection 9, 10 and 11 of the parallel side faces 6—7, 7—8 and 8—6 respectively, the lines 9, 10 and 11, forming cutting edges which dress and smooth the bore, cut by the edges DEA, DFB and DGC.

The parallel faces 6, 7 and 8 and their parallel edges 9, 10 and 11 allow for regrinding of the end faces for sharpening of the drill without losing cutting diameter, and together with the angularity of the three cutting edges DEA, DFB and DGC provide directional stability to the drill.

The angularity of the cutting edges provides a longer cutting edge for any given diameter hole, spreading the wear and friction over a greater surface and also tends to prevent hard spots (such as knots in wood) from throwing the drill off center. The triangular cross section gives stability at the same time that it provides a substantial amount of chip space, which is further increased by the fact that the shank of the drill is smaller than the hole being drilled.

For dowel work the cutting diameters required are small, frequently small fractions of an inch but with drill lengths of the order of 12 inches. The drill of the invention has proved to be excellent for this type of drilling but the advantages above pointed out are useful in drills for other or general purposes.

The angle of slope $a$ of the end faces of the drill is not critical and will be selected in accordance with the material being drilled. The harder or tougher the material being drilled the smaller or less precipitous will be the slope of the end faces. The slope $a$ of a given drill may be changed at the time of regrinding for sharpening purposes or at any time such change is desired.

The described method of making the drill is far less expensive than conventional methods of making prior drills such as twist drills, and the drill is much stronger since no spiral fluting is involved, and more metal is left in the cross section of the drill.

What is claimed is:

1. A drill having a head equilateral-triangular in cross section and a shank circular in cross section, said head and shank having a common longitudinal axis, the head having three intersecting planar side faces lying parallel to and equally spaced from said axis, and three geometrically similar, four-sided, planar end faces intersecting said axis at a common point, and intersecting each other to form leading cutting edges, each of said end faces intersecting two adjacent side faces to form trailing cutting edges, the lines of intersection of said three side faces forming cutting edges to dress the surface of the bore cut by said leading and trailing edges.

2. The method of forming a drill which comprises forging an end portion of a rod, circular in cross section, to equilateral-triangular cross section concentric with the longitudinal axis of the rod, forming a cutting head by grinding the flat sides of at least the outer end portion of the so-formed said triangular portion to form three planar intersecting side faces which are parallel to and equally spaced from said longitudinal axis, and grinding the end face successively in three grinding planes which respectively intersect successive side faces of the head at a given angle to a plane which intersects the longitudinal axis of the head and the three lines of intersection of the said three side faces at right angles, to thereby form three planar end faces which intersect the longitudinal axis of the head at a common point, and which intersect each other and the two adjacent side faces of the head.

3. A drill as in claim 1, the said shank being of less diameter than the cutting diameter of the head.

References Cited in the file of this patent
UNITED STATES PATENTS

| | | |
|---|---|---|
| 2,260,288 | Black | Oct. 28, 1941 |
| 2,587,980 | Doepker | Mar. 4, 1952 |
| 2,977,828 | Strickland | Apr. 4, 1961 |